United States Patent
Su et al.

(10) Patent No.: US 12,393,628 B2
(45) Date of Patent: Aug. 19, 2025

(54) MULTIMEDIA CONTENT PUBLISHING METHOD AND APPARATUS, ELECTRONIC DEVICE, AND STORAGE MEDIUM

(71) Applicant: BEIJING BYTEDANCE NETWORK TECHNOLOGY CO., LTD., Beijing (CN)

(72) Inventors: Kai Su, Beijing (CN); Changhu Wang, Beijing (CN)

(73) Assignee: BEIJING BYTEDANCE NETWORK TECHNOLOGY CO., LTD., Beijing (CN)

( * ) Notice: Subject to any disclaimer, the term of this patent is extended or adjusted under 35 U.S.C. 154(b) by 94 days.

(21) Appl. No.: 18/024,016

(22) PCT Filed: Aug. 18, 2021

(86) PCT No.: PCT/CN2021/113345
§ 371 (c)(1),
(2) Date: Feb. 28, 2023

(87) PCT Pub. No.: WO2022/042401
PCT Pub. Date: Mar. 3, 2022

(65) Prior Publication Data
US 2023/0267142 A1 Aug. 24, 2023

(30) Foreign Application Priority Data
Aug. 28, 2020 (CN) .......................... 202010887573.6

(51) Int. Cl.
G06F 16/44 (2019.01)
G06F 16/43 (2019.01)
(Continued)

(52) U.S. Cl.
CPC .............. *G06F 16/44* (2019.01); *G06F 16/43* (2019.01); *G06F 16/45* (2019.01); *G06N 3/0464* (2023.01); *G06N 3/08* (2013.01)

(58) Field of Classification Search
CPC .......... G06F 16/44; G06F 16/43; G06F 16/45; G06F 16/583; G06F 16/958; G06N 3/0464; G06N 3/08; H04L 67/06; H04L 67/55
See application file for complete search history.

(56) References Cited

U.S. PATENT DOCUMENTS

| 9,280,742 B1 * | 3/2016 | Sargin ..................... G06N 20/00 |
| 10,623,890 B1 | 4/2020 | Greenberger et al. |

(Continued)

FOREIGN PATENT DOCUMENTS

| CN | 105530174 A | 4/2016 |
| CN | 106021398 A | 10/2016 |

(Continued)

OTHER PUBLICATIONS

European Patent Application No. 21860239.9; Extended Search Report; dated Nov. 27, 2023; 7 pages.

(Continued)

*Primary Examiner* — Charles Rones
*Assistant Examiner* — Xiaoqin Hu
(74) *Attorney, Agent, or Firm* — BakerHostetler

(57) ABSTRACT

A multimedia content publishing method and apparatus, an electronic device and a storage medium. The method includes: determining a multimedia content to be published (S101); obtaining a plurality of candidate topics matching the multimedia content, the candidate topics being topics whose relevancy to the multimedia content meets a predetermined condition among topics included in a topic set (S102); determining a selected target topic among the plu- (Continued)

rality of candidate topics (S103); and sending multimedia content publishing information containing the target topic to a server in response to a multimedia content publishing request. According to the method, a topic having relatively high relevance to multimedia content can be automatically provided for a user, thus saving time for users to think about and edit topics and improving the accuracy of topic selection.

20 Claims, 8 Drawing Sheets

(51) Int. Cl.
*G06F 16/45* (2019.01)
*G06N 3/0464* (2023.01)
*G06N 3/08* (2023.01)

(56) References Cited

U.S. PATENT DOCUMENTS

| | | | |
|---|---|---|---|
| 2007/0088711 | A1 | 4/2007 | Craggs |
| 2011/0295851 | A1* | 12/2011 | El-Saban ............... G06F 16/748 715/764 |
| 2015/0067505 | A1 | 3/2015 | Metcalf et al. |
| 2015/0193482 | A1 | 7/2015 | Kaushansky et al. |
| 2017/0052662 | A1* | 2/2017 | Smith, Jr. ........... G06F 16/2428 |
| 2017/0052954 | A1 | 2/2017 | State et al. |

FOREIGN PATENT DOCUMENTS

| | | |
|---|---|---|
| CN | 106533915 A | 3/2017 |
| CN | 109753571 A | 5/2019 |
| CN | 110868639 A | 3/2020 |
| CN | 111400517 A | 7/2020 |
| CN | 111510762 A | 8/2020 |
| CN | 112035687 A | 12/2020 |

OTHER PUBLICATIONS

International Patent Application No. PCT/CN2021/113345; Int'l Written Opinion and Search Report; dated Nov. 17, 2021; 7 pages.
Otsuka et al.; "A hashtag recommendation system for twitter data streams"; Computational Social Networks; vol. 3; 2016; 26 pages.
Wu et al.; "Based on parallel moving target detection of GPU researching the method"; Electronic Design Engineering; vol. 24 No. 22; Nov. 2016; p. 134-137 (contains English Abstract).

* cited by examiner

MULTIMEDIA CONTENT PUBLISHING METHOD AND APPARATUS, ELECTRONIC DEVICE, AND STORAGE MEDIUM

CROSS REFERENCE TO RELATED APPLICATIONS

The disclosure is the U.S. National Stage of International Application No. PCT/CN2021/113345, titled "MULTIMEDIA CONTENT PUBLISHING METHOD AND APPARATUS, ELECTRONIC DEVICE, AND STORAGE MEDIUM", filed on Aug. 18, 2021, which claims priority to Chinese Patent Application No. 202010887573.6, field on Aug. 28, 2020, titled "MULTIMEDIA CONTENT PUBLISHING METHOD AND APPARATUS, ELECTRONIC DEVICE, AND STORAGE MEDIUM", the entire contents of both of which are incorporated herein by reference.

FIELD

The present disclosure relates to the technical field of information processing, in particular to a multimedia content publishing method and apparatus, an electronic device and a storage medium.

BACKGROUND

With development of an Internet technology, a variety of We Media social applications (APP) have emerged, where all users can upload their multimedia contents such as videos and pictures, and can edit the corresponding topics for the uploaded multimedia contents. The use of topics can help users understand the subject content of multimedia content, and also facilitate the search signal for multimedia content search.

Currently, it mainly relies on manual way to edit topics, which is time-consuming and laborious.

SUMMARY

An embodiment of the disclosure at least provides a solution for multimedia content publishing, which can automatically provide a user with a topic with high relevancy to a multimedia content, save time of the user for thinking and editing the topic, and improve accuracy of topic selection.

The disclosure mainly includes the following aspects:

The first aspect of the disclosure provides a multimedia content publishing method, comprising:
  determining a multimedia content to be published;
  obtaining a plurality of candidate topics matching the multimedia content, the candidate topics being topics whose relevancy to the multimedia content meets a predetermined condition among topics included in a topic set;
  determining a selected target topic among the plurality of candidate topics; and
  sending multimedia content publishing information containing the target topic to a server in response to a multimedia content publishing request.

The second aspect of the disclosure provides a multimedia content publishing method, comprising:
  obtaining a multimedia content to be published;
  selecting a plurality of candidate topics matching the multimedia content from a prestored topic set, and returning the plurality of selected candidate topics to a client;
  receiving multimedia content publishing information containing a target topic, the target topic being a topic included in the plurality of candidate topics; and
  publishing the multimedia content based on the multimedia content publishing information.

The third aspect of the disclosure provides a multimedia content publishing apparatus, comprising:
  a content determining module, configured to determine a multimedia content to be published;
  a topic obtaining module, configured to obtain a plurality of candidate topics matching the multimedia content, the candidate topics being topics whose relevancy to the multimedia content meets a predetermined condition among topics included in a topic set;
  a topic determining module, configured to determine a selected target topic among the plurality of candidate topics; and
  an information sending module, configured to send multimedia content publishing information containing the target topic to a server in response to a multimedia content publishing request.

The fourth aspect of the disclosure provides a multimedia content publishing apparatus, comprising:
  a content obtaining module, configured to obtain a multimedia content to be published;
  a topic selecting module, configured to select a plurality of candidate topics matching the multimedia content from a prestored topic set, and returning the plurality of selected candidate topics to a client;
  an information receiving module, configured to receive multimedia content publishing information containing a target topic, the target topic being included in the plurality of candidate topics; and
  a content publishing module, configured to publish the multimedia content based on the multimedia content publishing information.

The fifth aspect of the disclosure provides an electronic device, comprising: a processor, a memory and a bus, wherein the memory stores machine-readable instructions that can be executed by the processor, the processor is configured to execute the machine-readable instructions stored in the memory, when the electronic device is running, the processor communicates with the memory through the bus, and the machine-readable instructions, when executed by the processor, execute the steps of the multimedia content publishing method provided in any of the embodiments of the first or second aspect.

The sixth aspect of the disclosure provides a computer readable storage medium, storing computer program that upon execution by an electronic device, cause the electronic device to perform the steps of the multimedia content publishing method provided in any of the embodiments of the first or second aspect.

With the above-described scheme for multimedia content publishing, in the case where the multimedia content to be published has been determined, a plurality of candidate topics matching the multimedia content can be obtained, and then, in the case where a target topic selected among the plurality of candidate topics is determined, the multimedia content publishing information containing the target topic can be sent to the server in response to the multimedia content publishing request. The above solution for multimedia content publishing can automatically provide users with topics that are highly relevant to multimedia content, saving time for users to think about and edit topics and improving the accuracy of topic selection.

In order to make the above objectives, features and advantages of the disclosure more obvious and understandable, detailed description is given as follows by giving preferred embodiments below and in conjunction with the attached drawings.

BRIEF DESCRIPTION OF THE DRAWINGS

In order to more clearly explain the technical solution of the embodiments of the disclosure, the drawings needed to be used in the embodiments will be briefly introduced below. The drawings here, which are incorporated in and constitute a part of the specification, illustrate embodiments consistent with the disclosure and together with the specification serve to illustrate the technical solutions of the disclosure. It should be understood that the following drawings only show some embodiments of the disclosure, and thus should not be regarded as limiting the scope. Those skilled in the art can further obtain other relevant drawings according to these drawings without any creative effort.

FIG. 2(*b*) shows a schematic application diagram of another multimedia content publishing method provided by embodiment 1 of the disclosure.

FIG. 2(*c*) shows a schematic application diagram of another multimedia content publishing method provided by embodiment 1 of the disclosure.

FIG. 2(*d*) shows a schematic application diagram of another multimedia content publishing method provided by embodiment 1 of the disclosure.

DETAILED DESCRIPTION OF THE EMBODIMENTS

Figure 1:
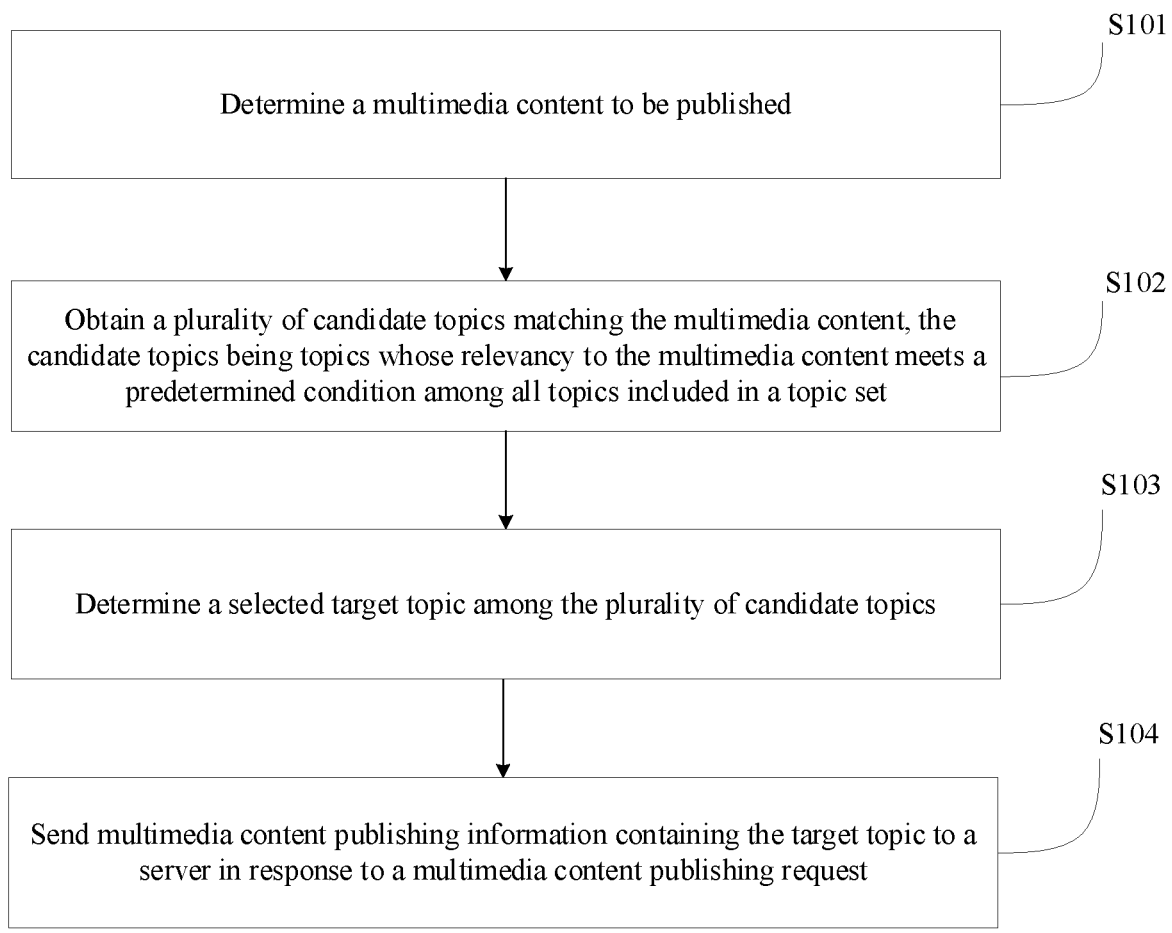
FIG. 1 shows a flow diagram of a multimedia content publishing method provided by embodiment 1 of the disclosure.

In order to make objectives, technical solutions and advantages of the embodiments of the disclosure clearer, the technical solutions in the embodiments of the disclosure will be described below clearly and completely with reference to the drawings in the embodiments of the disclosure. Obviously, the described embodiments are only part of the embodiments of the disclosure, but not all the embodiments. The components of the embodiments of the disclosure, which are generally described and shown herein, may be arranged and designed in various different configurations. Therefore, the following detailed description of the embodiments of the disclosure is not intended to limit the scope of the disclosure required to be protected, but only represents selected embodiments of the disclosure. On the basis of the embodiments of the disclosure, all other embodiments obtained by those skilled in the art without inventive efforts fall within the protection scope of the disclosure.

Through research, it is found that when a user uploads his/her own multimedia content, the related art mainly relies on a manual mode to edit a topic for the uploaded multimedia content, which is time-consuming and laborious.

Based on the above research, the disclosure provides at least one solution for multimedia content publishing, which can automatically provide the user with a topic with high relevancy to a multimedia content, save time of the user for thinking and editing the topic, and improve accuracy of topic selection.

The defects existing in the above solution are all results of an inventor obtained after practice and careful study. Therefore, a discovery process of the above problems and the solution proposed by the disclosure below for the above problem should be the inventor's contribution to the disclosure in the process of the disclosure.

It should be noted that similar numerals and letters represent like items in the following drawings, therefore, once an item is defined in one drawing, it does not require further definition and explanation in the subsequent drawings.

In order to facilitate the understanding of the present embodiment, a multimedia content publishing method disclosed in the embodiment of the disclosure is first introduced in detail. An executive body of the multimedia content publishing method provided by the embodiment of the disclosure is generally an electronic device with certain computing power. The electronic device includes, for example, a terminal device or a server or other processing devices. The terminal device may be user equipment (UE), a mobile device, a client, a terminal, a cellular phone, a cordless phone, a personal digital assistant (PDA), a handheld device, a computing device, a vehicle-mounted device, a wearable device and the like. In some possible implementations, the multimedia content publishing method can be implemented by a processor calling computer readable instructions stored in a memory.

The multimedia content publishing method provided by the embodiment of the disclosure is illustrated below by taking the executive body being the client as an example.

Embodiment 1

As shown in FIG. 1, which is a flow diagram of a multimedia content publishing method provided by an embodiment of the disclosure, the method includes steps S101 to S104:

S101, a multimedia content to be published is determined;

S102, a plurality of candidate topics matching the multimedia content are obtained, the candidate topics being topics whose relevancy to the multimedia content meets a predetermined condition among all topics included in a topic set;

S103, a selected target topic among the plurality of candidate topics is determined; and S104, multimedia content publishing information containing the target topic is sent to a server in response to a multimedia content publishing request.

Here, in order to facilitate the understanding of the multimedia content publishing method provided by the embodiment of the disclosure, an application scenario of the method is first illustrated in detail. The above multimedia content publishing method is mainly applicable to the application scenario with multimedia publishing requirements. Generally, effective publishing of the multimedia content can facilitate the subsequent multimedia search, browsing, etc. Considering that the topic determined for the multimedia content to be published in related art mainly depends on manual editing, a user is required to summarize the multimedia content when manually editing the topic. However, not all the users have such ability or enough time to summarize. Therefore, either the topic edited by the user is not highly relevant to the multimedia content to be published, or the topic bar is left vacant, so that it is not easy for other users to understand the multimedia content posted, not to mention the subsequent search and browsing of the relevant multimedia, etc.

To solve the above problem, the embodiment of the disclosure provides the multimedia content publishing method, which can automatically provide the user with the plurality of candidate topics, and saves the time of the user for thinking and editing the topic. In addition, the candidate topics provided by the above multimedia content publishing method for the user are topics with high relevancy to the multimedia content to be published. In this way, after the user selects the target topic from the candidate topics, the multimedia content containing the target topic may be sent to the server.

Since the candidate topics are determined based on the relevancy with the multimedia content, thus to a certain extent it can provide more accurate topic alternatives for the multimedia content, and considering that the target topic is determined based on the result of the user's independent selection, thus the determined topic can be strongly related to the user's intention, which to a certain extent can more accurately express the multimedia content so that other user can more accurately understand the multimedia content and improve the service quality of the publishing platform.

The multimedia content to be published in the embodiment of the disclosure may include the multimedia content uploaded by the user. The multimedia content here may be pictures, videos, or other multimedia content forms. Considering the wide application of video search, the video will be taken as an example below for specific description.

In the embodiment of the disclosure, in order to facilitate the determination of the multimedia content to be published, a corresponding upload button may be set on a publishing page of the client. For example, after the user enters the publishing page, the multimedia content uploaded by the user may be obtained in response to a trigger operation for the upload button.

When the multimedia content to be published is determined, the embodiment of the disclosure may obtain the plurality of candidate topics matching the multimedia content, so that the user can conveniently select the target topic directly related to the user intention therefrom.

The candidate topics in the embodiment of the disclosure may be determined based on the relevancy. Because the more accurate topic alternatives may be provided for the multimedia content to a certain extent, further considering that the target topic is determined based on the independent selection result of the user, the determined topic may be strongly related to the user intention, which can more accurately express the multimedia content to a certain extent, so that other users can understand the multimedia content more accurately and improve the service quality of the publishing platform.

In specific applications, the above candidate topics may be topics with high relevancy to the multimedia content to be published selected from user-edited topics corresponding to all historical multimedia contents obtained from various search platforms. The search platform here may be an encyclopedic search platform, a multimedia search platform, or other search platforms. The historical multimedia contents here may be obtained from search records of all the above search platforms in a period of time closest to the current publishing time.

It should be noted that in the process of screening the candidate topics, screening may be based on a predetermined condition related to the relevancy. It may be that the topics in a preset rank are screened from the topic set. In specific applications, the multimedia content to be published may be input into a trained relevancy model.

In the embodiment of the disclosure, in order to facilitate the selection of the target topic meeting the user's intent from the candidate topics, the above candidate topics may be displayed at the client first. In order to enhance the interaction experience between the user and the publishing platform, the candidate topics may be displayed in response to a trigger operation on the buttons for adding a target identifier set on the publishing page of the client.

In specific applications, all the above candidate topics may be displayed in a vertical-row display mode or a horizontal-row display mode. In this way, for the plurality of candidate topics displayed in the vertical-row display mode, the above plurality of candidate topics may be displayed in a vertical scrolling manner by touching up-down trigger instructions on a screen of the client. Similarly, for the plurality of candidate topics displayed in the horizontal-row display mode, the above plurality of candidate topics may be displayed in a horizontal scrolling manner by touching left-right trigger instructions on the screen of the client.

The embodiment of the disclosure can select which display mode to be specifically used in combination with a landscape picture or portrait picture currently presented by the client. For example, under the premise that the client presents the landscape picture, the horizontal-row display mode may be used since the client has a large horizontal size. Under the premise that the client presents the portrait picture, the vertical-row display mode may be used since the client has a large vertical size.

In the embodiment of the disclosure, after determining all the candidate topics, the target topic related to the user's intent may be selected based on a selection operation of the user. In order to facilitate the selection operation of the user, candidate topic and target topic may be displayed in different display boxes. In specific applications, after it is determined that a target identifier input into a topic input box is detected on the publishing page, a plurality of obtained candidate topics matching the multimedia content are displayed in a topic selection box corresponding to the topic input box. In response to a selection operation in the topic selection box, the target topic may be selected from the plurality of candidate topics displayed in the above topic selection box, and the selected target topic may be displayed in the topic input box.

After the target topic selected by the user is determined, the multimedia content publishing information containing the target topic may be sent to the server under a premise of responding to the multimedia content publishing request.

The above multimedia content publishing information may include the multimedia content uploaded by the user, and may further include the target topic selected for the multimedia content. In addition, the above multimedia content publishing information may further include publishing time, a publishing location and other information.

It should be noted that information related to user privacy right, such as the publishing location, may be collected after obtaining user authorization.

For all the published multimedia contents, after a user initiates a search request to the server, the multimedia content corresponding to the search request is pushed to the user based on the target topic contained in the multimedia content. Since the target topic identifies the multimedia content with a high degree of relevance, it can, to a certain extent, increase the number of views of multimedia content.

According to the multimedia content publishing method provided by the embodiment of the disclosure, a corresponding publishing button may be set on the publishing page of the client. For example, after the user selects the target topic, the multimedia content publishing information containing the target topic is published in response to a trigger operation on the publishing button.

The multimedia content publishing information in the embodiment of the disclosure may include not only related multimedia contents, but also include other publishing information. For example, the multimedia content publishing information may include cover page setting information used for multimedia content publishing on the publishing page of the client, may also include label adding information such as a location and a multimedia content source, and may further include information related to a publishing authority and the publishing time, which is not specifically limited in the embodiment of the disclosure.

The above multimedia content publishing method provided by the embodiment of the disclosure may be illustrated with a client interface diagram shown in FIG. 2(a), FIG. 2(b), FIG. 2(c) and FIG. 2(d).

Figure 2A:
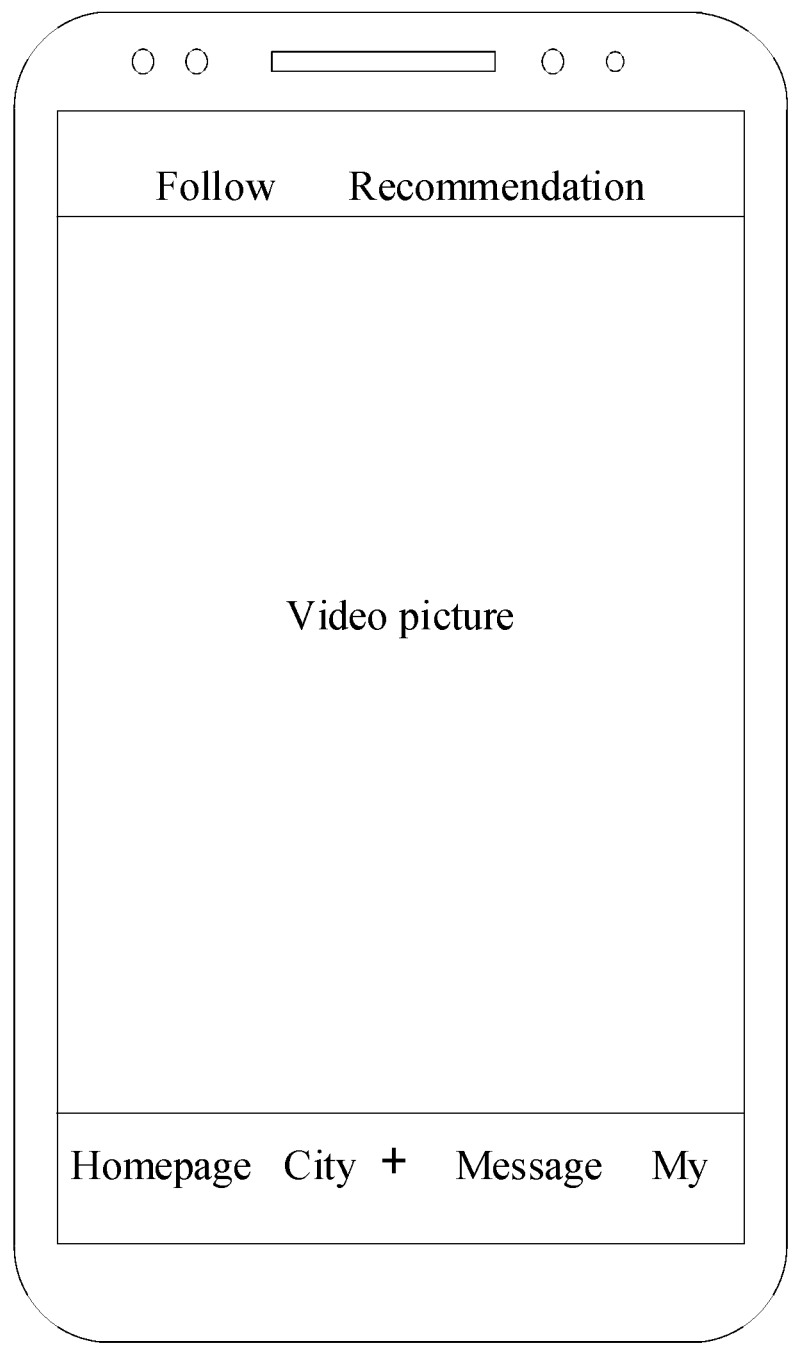
FIG. 2(*a*) shows a schematic application diagram of a multimedia content publishing method provided by embodiment 1 of the disclosure.

As shown in FIG. 2(a), the publishing page presented by the client includes the upload button (as shown by "+"). After the user triggers the upload button, a cat video may be uploaded.

Figure 2B:
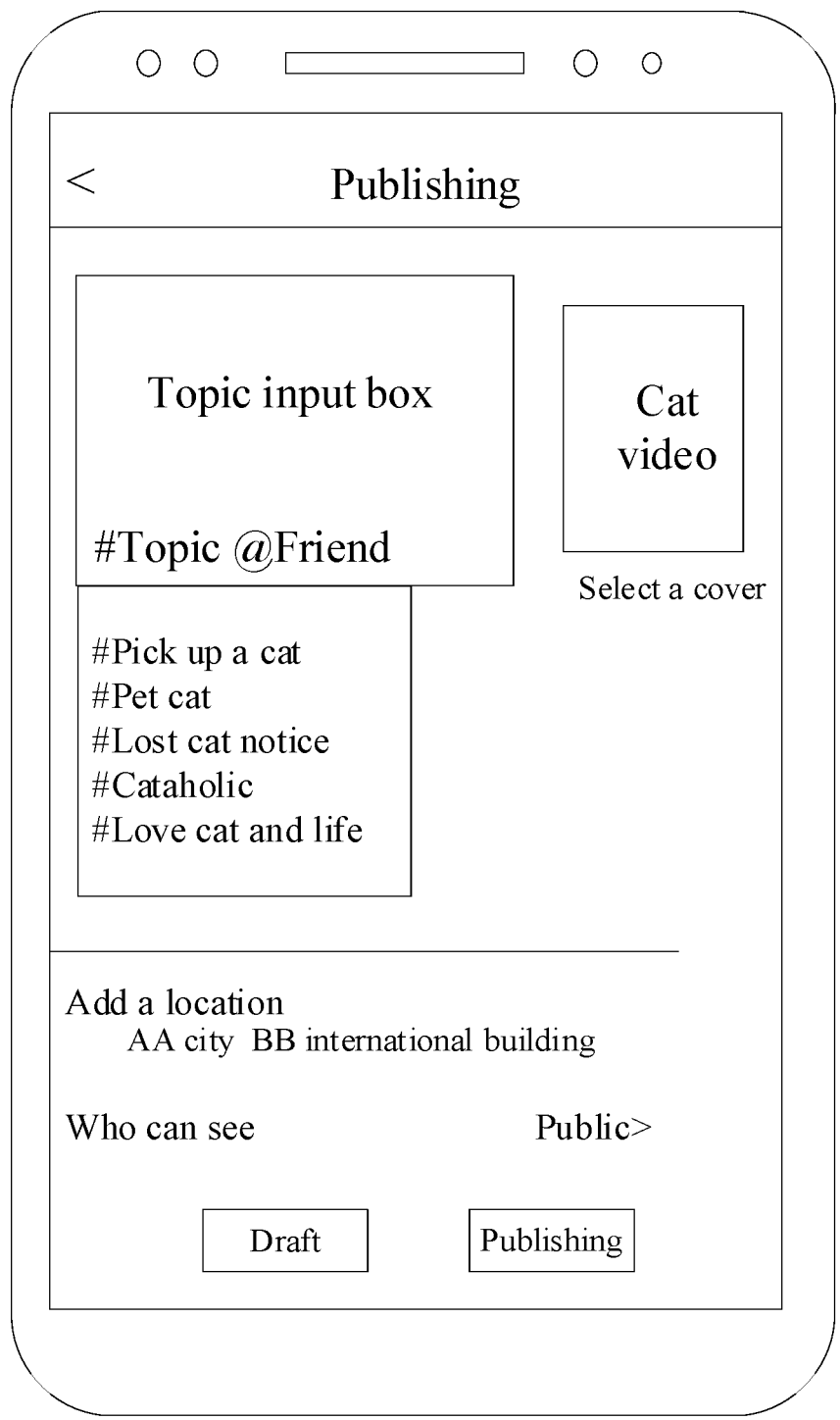
Figure 2C:
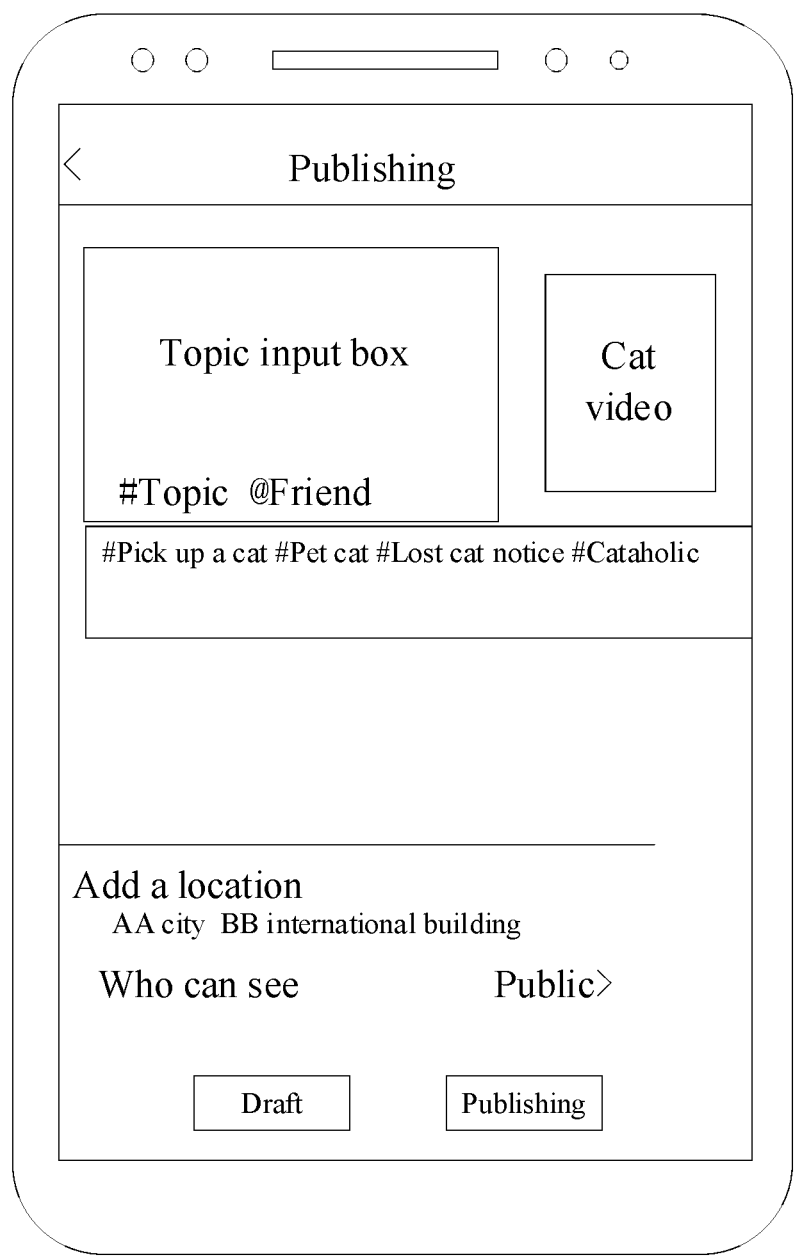

Then the server may determine a plurality of candidate topics (e.g., hashtags) matching the cat video based on the uploaded cat video to be published, such as "Pick up a cat", "Pet cat", "Lost cat notice", "Cataholic", or "love cat and life". The client may obtain the above candidate topics from the server in response to a trigger operation on a button for adding a target identifier (as shown by "#") on the publishing page and correspondingly display the obtained candidate topics in the topic selection box. The vertical-row display mode of the plurality of candidate topics is shown in FIG. 2(b). According to the embodiment of the disclosure, the plurality of candidate topics may be displayed below the target identifier in a pull-down menu after the target identifier is triggered. In addition, the horizontal-row display mode of the plurality of candidate topics is shown in FIG. 2(c). After the target identifier is triggered, the plurality of candidate topics is displayed below the target identifier in a horizontal expansion mode.

Figure 2D:
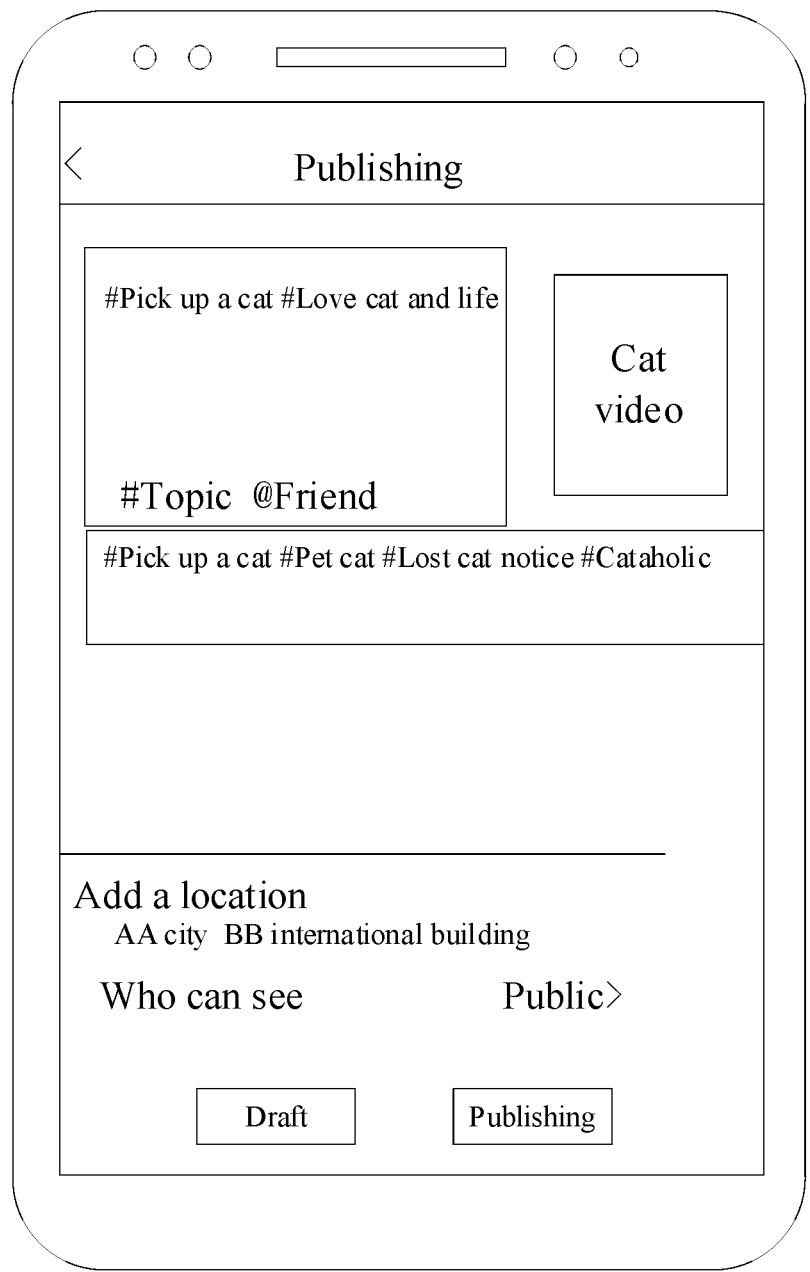

For all the candidate topics displayed on the current publishing page of the client, the selection operation may be executed to select the target topic that is closest to the user's intent, that is, "Pick up a cat", and "Love cat and life", as shown in FIG. 2(d), may be displayed in the topic input box.

As shown in FIG. 2(d), the publishing button is set on the publishing page. After the publishing button is triggered, the above multimedia content publishing information containing hashtag "Pick up a cat" and "Love cat and life", may be published to the server.

In addition, as shown in FIG. 2(a), FIG. 2(b), FIG. 2(c) and FIG. 2(d), other multimedia content publishing information may further be set, such as geographic information (as shown in AA City and BB International Building), cover page setting information, publishing settings (such as who can see) and other related information, which will not be repeated here.

The multimedia content publishing method provided by the embodiment of the disclosure will be further illustrated from the server side.

Embodiment 2

Figure 3:
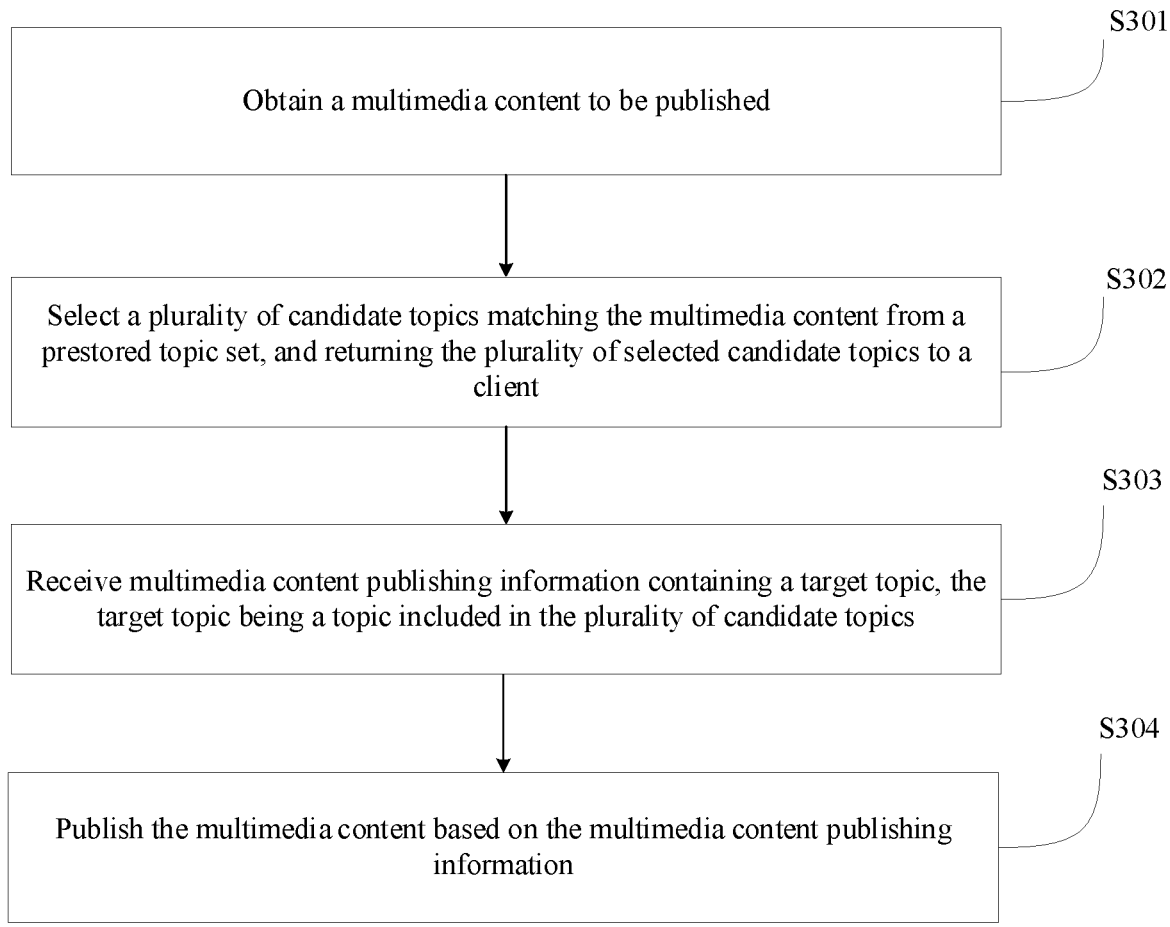
FIG. 3 shows a flow diagram of a multimedia content publishing method provided by embodiment 2 of the disclosure.

As shown in FIG. 3, which is a flow diagram of a multimedia content publishing method provided by embodiment 2 of the disclosure, the method includes steps S301 to S304:

S301, a multimedia content to be published is obtained;

S302, a plurality of candidate topics matching the multimedia content are selected from a prestored topic set, and the plurality of selected candidate topics are returned to a client;

S303, multimedia content publishing information containing a target topic is received, the target topic being a topic included in the plurality of candidate topics; and S304, the multimedia content is published based on the multimedia content publishing information.

In the above steps, the description related to the multimedia content and the multimedia content publishing information refer to those of embodiment 1 of the disclosure, which will not be repeated herein.

In order to determine the candidate topics matching the obtained multimedia content to be published, the embodiment of the disclosure may rely on the relevancy between the stored topic set and the multimedia content, that is, topics with high relevancy to the multimedia content may be selected from the stored topic set as candidate topics of the multimedia content.

The above topic set may be generated based on a user-edited topic corresponding to a historical multimedia content in the user historical search data. For the user-edited topic, please refer to the relevant description of embodiment 1 above, which will not be repeated herein.

After the matching candidate topics are selected for the multimedia content, one or more selected candidate topics may be pushed to the client, so that the client may select a target topic that meets its own publishing intent therefrom, and send the multimedia content publishing information containing the target topic to the server. The selection of the target topic and the publishing of the multimedia content publishing information are described in Example 1 above and will not be repeated here.

After the server receive the multimedia content publishing information sent by the client, the multimedia content may be published based on the multimedia content publishing information. In this way, once the corresponding multimedia content is published, since the target topic related to multimedia content relevancy carried in the multimedia content publishing information may be used as the search basis, compared with the generally published multimedia content, the possibility that it is subsequently searched in real time will be greatly improved, thus improving exposure of the multimedia content.

The topic set stored in the embodiment of the disclosure is composed of several topics. In this way, after obtaining the multimedia content to be published from the client, the relevancy between the multimedia content and each topic in the topic set may be determined, and one or more candidate topics are selected from the topic set based on the relevancy.

Figure 4:
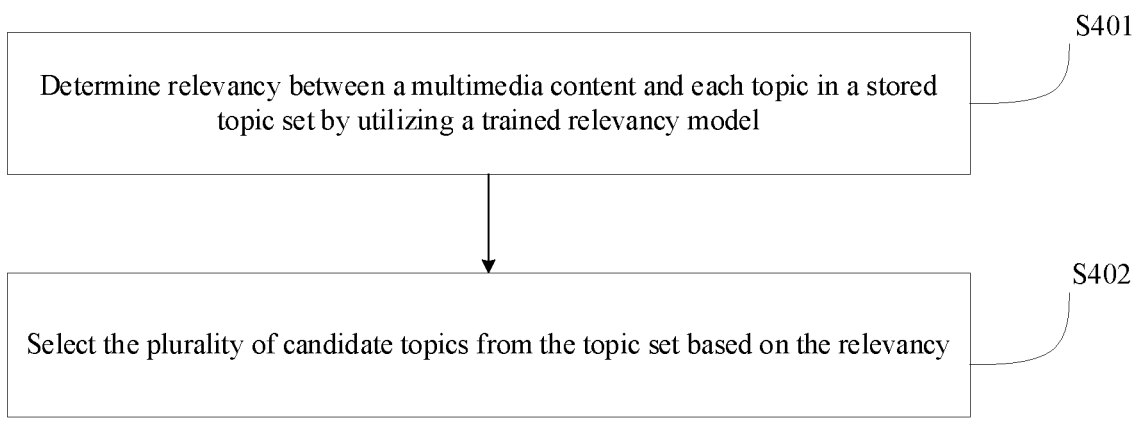
FIG. 4 shows a flow diagram of a specific method of selecting a candidate topic in a multimedia content publishing method provided by embodiment 2 of the disclosure.

As shown in FIG. 4, the candidate topics may be selected from the prestored topic set according to the following steps:

S401, the relevancy between the multimedia content and each topic in the stored topic set is determined by utilizing a trained relevancy model; and S402, the plurality of candidate topics are selected from the topic set based on the relevancy.

The relevancy model in the embodiment of the disclosure may be a multi-classification model related to topic. In a process of model training, topics with higher relevance to the input multimedia content are expected to be selected from the topics. After the training of the relevancy model is completed, the relevancy between the multimedia content and each topic in the stored topic set may be determined respectively. In some embodiments, topics with relevancy in a preset rank may be selected from the ranking results of all the relevancy as candidate topics, for example, topics ranking in the top 10 may be selected as the candidate topics.

Training data for training the relevancy model in the embodiment of the disclosure may be determined based on the specific application scenario of the multimedia content publishing method provided by the disclosure. That is, the corresponding training data may be obtained based on the application scenario, and then the relevancy model is trained, which specifically includes the following steps:

step A, each historical multimedia content and a user-edited topic corresponding to each historical multimedia content are obtained;

step B, for each historical multimedia content, the user-edited topic corresponding to the historical multimedia content is taken as a positive class topic corresponding to the historical multimedia content, and the user-edited topics corresponding to other historical multimedia content other than the historical multimedia content are taken as a negative class topic corresponding to the historical multimedia content; and step C, each historical multimedia content, the positive class topic corresponding to the historical multimedia content, and the negative class topic corresponding to the historical multimedia content are taken as a training data group, and the relevancy model to be trained is trained based on a plurality of training data groups so as to obtain model parameters of the relevancy model.

In one embodiment, the historical multimedia content historically published and the corresponding user-edited topics thereof may be obtained from the publishing platform first. The historical multimedia content corresponds to its user-edited topic. For example, for videos related to "BB new song", its corresponding user-edited topic may be "BB new song".

The above relevancy model may be a multi-classification model. For each historical multimedia content, the positive class topic and negative class topic corresponding to the historical multimedia content may be determined. The historical multimedia content has higher relevancy to the positive class topic and has lower relevancy to the negative class topic. The positive class topic of one historical multimedia content may be the user-edited topic corresponding to this historical multimedia content, while the negative class topic may be the user-edited topics corresponding to other historical multimedia contents.

In the embodiment of the disclosure, each historical multimedia content, the positive class topic of the historical multimedia content, and the negative class topic of the historical multimedia content are taken as the training data group, and thus the relevancy model may be trained so as to obtain the model parameters of the relevancy model. In this way, after obtaining a multimedia content to be published, the relevancy between the multimedia content and each topic in the topic set may be determined based on the model parameters.

It should be noted that feature processing is usually required before the actual training of the relevancy model. In one embodiment, a multimedia feature vector may be extracted from the multimedia content and a topic feature vector may be extracted from each topic in the topic set respectively, and then the relevancy between the multimedia content and the topics may be determined based on vector relevancy between the multimedia feature vector and the topic feature vector.

The above extracted multimedia feature vector may be a feature related to the multimedia content and directly extracted from the corresponding multimedia content, such as video scenario information, video duration information of one video and other features, or may further be extracted based on a pre-trained multimedia feature extraction model.

In a case that the extracted multimedia feature vector is the feature vector related to the multimedia content, the multimedia feature extraction model here may be obtained by training through convolutional neural networks (CNN). The networks may train an association relationship between the input multimedia content and its various dimensional attributes. For example, for one video, 256-dimensional multimedia feature vectors may be obtained by training.

In one embodiment, the above topic feature vectors can be obtained by encoding the topic, for example, by one-hot encoding (also known as unique hot encoding), or by Word2vec (a word vector representation model used to generate word vectors), which is not specifically limited by the embodiment of the disclosure. For example, a 256-dimensional topic tag feature vector may be extracted for each topic in the topic set.

In a case that the multimedia feature vector and the topic feature vector are extracted according to the above method, the embodiment of the disclosure may train the relevancy model based on relevancy calculation. That is, the model parameters of the relevancy model may be determined, which may be specifically realized through the following steps:

step 1, for each training data group among a plurality of training data groups, the training data group is input into the relevancy model to be trained, so as to determine first relevancy between the historical multimedia content corresponding to the training data group and the positive class topic corresponding to the historical multimedia content, and second relevancy between the historical multimedia content corresponding to the training data group and each of the negative class topics corresponding to the historical multimedia content; and step 2, if a difference value between the first relevancy and any second relevancy in all the second relevancy is less than a predetermined threshold, the model parameters of the relevancy model are adjusted, the relevancy model to be trained is trained again until the difference values between the first relevancy and each second relevancy are each greater than or equal to the predetermined threshold, and training is stopped to obtain model parameters of the trained relevancy model.

The loss function used in a traditional multi-classification model optimizes the model usually by making the score of the class to which the current training sample belongs as large as possible, i.e., the great likelihood estimation method, which uses a loss function that makes an implicit distinction between different classes and can guarantee the separability between different classes, which performs well on the traditional classification task.

However, considering that the multimedia content publishing method provided by the embodiment of the disclosure is applicable to scenarios such as We-Media social application, the number of topic recommendation/classification categories generated thereof is huge and up to 10000 levels. If the traditional multi-classification mode is still adopted, due to the large number of classification categories, although the above traditional mode can guarantee the distinguishability between the different classes, it does not guarantee sufficient differentiation between different classes, nor does it guarantee that similar classes are as compact as possible, which leads to the inability to effectively differentiate the huge number of categorization categories, and the accuracy rate decreases.

To solve the problem, the embodiment of the disclosure provides a solution scheme for determining a loss function to train a model based on the relevancy difference value. In the process of training the relevancy model, a loss function value may be determined based on the difference value between the first relevancy between the determined historical multimedia content and the positive class topic corresponding to the historical multimedia content, and the second relevancy between the historical multimedia content and each negative class topic corresponding to the historical multimedia content. If the loss function value is less than the predetermined threshold, it is determined that the model parameters of the relevancy model need to be adjusted reversely. After the relevant model parameters are adjusted, the next turn of model training may be performed until the difference value between the above two relevancy is large enough, that is, the training is stopped when it is greater than the predetermined threshold.

It can be known that by adopting the above model training method, the classification discrimination is explicitly guaranteed. That is, the model is able to determine with sufficient confidence the positive class topics and negative class topics of a historical multimedia content. Only with sufficient confidence, the loss of the model is smaller, so that the learned model parameters can ensure that the difference between different classes is large enough, and the same classes can be more compact, thus ensuring the accuracy of the model.

Considering that in the process of model training, for one training data group, it is easy to determine the positive class topic related to the historical multimedia content in the training data group. In order to calculate the loss function, it is necessary to find the negative class topic and corresponding negative class score for the historical multimedia content. For a large training data set, if all negative classes are exhaustively enumerated for one historical multimedia content in each turn of training to make the positive class scores of the historical multimedia content be greater than all [negative class scores+predetermined threshold], it will lead to low training efficiency.

To solve the problem, an embodiment of the disclosure provides a training scheme for simulating global exhaustive negative classes based on division of the training data groups. A plurality of rounds of training may be performed for the relevancy model to be trained. Before each round of training, the plurality of training data groups may be randomly divided into a plurality of training data sets. In this way, each training data set among the plurality of training data sets is traversed sequentially, and the current round of model training is performed on the relevancy model to be trained based on the traversed training data set until all the training data sets are traversed, so as to obtain the model parameters of the relevancy model trained in the current round.

In one embodiment, since each training data set includes multiple training data groups, the loss function value may be determined according to the above determination mode of the relevancy difference value in the process of performing the current round of model training for each training data set, and then the current round of model training is realized. The specific training process is referred to the above description and will not be repeated here.

It can be seen that the embodiment of the disclosure adopts a local negative class sampling technique for each training data set among the plurality of training data sets corresponding to each round of training, that is, for each training data set, the negative class corresponding to one historical multimedia content is a part of negative class in the global classification, thus effectively avoiding the trouble of global negative class enumeration. And at the same time, before each round of model training, the training data groups will be randomly scattered, thus ensuring the diversity of negative class topics corresponding to a historical multimedia content in multiple rounds of training, so that the effect of global enumeration can be approximated as training continues.

In one embodiment of the disclosure, each round of model training may be realized specifically according to the following steps:

step 1, for each training data group in the traversed training data set, the training data group is input into the relevancy model to be trained, so as to determine the first relevancy between the historical multimedia content corresponding to the training data group and the positive class topic of the historical multimedia content, and the second relevancy between the historical multimedia content corresponding to the training data group and each of the negative class topics of the historical multimedia content;

step 2, a predetermined sampling number of second target relevancy is selected from all the second relevancy; and step 3, the model parameters of the current round of relevancy model to be trained are adjusted based on the first relevancy and the predetermined sampling number of selected second target relevancy.

In this embodiment, in order to further accelerate model training, K (corresponding to the predetermined sampling number) negative classes may be sampled for each round of model training. For one training data set, the number of the corresponding second relevancy is equal to the number B of the training data groups included in the training data set. In a case that K«B, the speed of calculating the loss function value of the model will become higher, thus improving the efficiency of model training.

Considering that in a process of model learning, there are always negative classes (corresponding to low scores of the negative classes) that are easy to distinguish and negative classes (corresponding to high scores of the negative classes) that are difficult to distinguish, in order to give consideration to the impact of various negative classes on the parameters of the model, one embodiment of the disclosure further provides a solution for mining the negative classes that are difficult to distinguish.

In the embodiment, in the process of selecting the K negative classes, on the one hand, a first number of second relevancy corresponding to a first predetermined proportion may be selected randomly from all the second relevancy based on the first predetermined proportion of a second target relevancy to be randomly selected in the predetermined sampling number of second target relevancy, for example, K/2 second relevancy may be randomly selected as the negative class. On the other hand, all the second relevancy may be ranked in an order from large to small, and then a second number of second relevancy corresponding to a second predetermined proportion is selected from all the ranked second relevancy based on the second predetermined proportion of the second target relevancy to be sequentially selected in the predetermined sampling number of second target relevancy, for example, the second relevancy of the top K/2 may be determined as the K/2 negative classes. In this way, the two groups of selected K/2 negative classes may be combined to obtain the K sampled negative classes.

In order to further understand the selection process of the above negative classes, illustration will be made below with B=10 and K=3 as examples. If the first predetermined proportion is ⅓ and the second predetermined proportion is ⅔, the corresponding first number and second number are 1 and 2 respectively. In this way, one second target relevancy may be randomly selected from the ten second relevancy. And after ranking the ten second relevancy, two second target relevancy may be selected sequentially, and the three selected second target relevancy may be used as the negative classes after sampling.

The loss function obtained using the above method not only ensures that model training can be done efficiently, but also explicitly corrects the model's learning of negative classes that are difficult to distinguish so that the positive class scores are sufficiently higher than the negative class scores that are difficult to learn, thus further ensuring the accuracy of model training.

In the embodiment of the disclosure, considering that there are many topics with the same semantics in a user-edited topic set, such as "# cute dog" and "# dog is so cute", after determining the positive class topic as "# cute dog" for the historical multimedia content in one training sample group, in order to avoid sampling "# dog is so cute" as the negative class topic, in the process of determining the negative topic, it may be determined based on a topic similarity screening result. That is, for each historical multimedia content, the positive class topic corresponding to other historical multimedia content other than the historical multimedia content, whose topic similarity with the positive class topic of the historical multimedia content is less than a predetermined threshold may be taken as the negative class topic corresponding to the historical multimedia content.

The topic similarity in the embodiment of the disclosure may represent the similarity between the two positive class topics. In some embodiments, it may be determined based on a cosine similarity between topic words, or a word overlapping degree, or other modes that can represent the similarity between the two positive class topics, which is not specifically limited here.

The word overlapping degree may represent, to a certain extent, the possibility of redundancy between the two topics. The greater the word overlapping degree is, the greater the possibility of redundancy is, and the lower the corresponding possibility of being sampled as the negative topics is. The lower the word overlapping degree is, the lower the possibility of redundancy is, and the higher the corresponding possibility of being sampled as the negative topics is. In the embodiment of the disclosure, the word overlapping degree between the two topics may be determined according to the following steps:

step 1, for two topics with the word overlapping degree to be calculated, word segmentation processing is performed on each of the two topics to obtain a plurality of topic words corresponding to each topic;

step 2, intersection processing is performed on the plurality of topic words respectively corresponding to the two topics to obtain a processed first topic word group, and union processing is performed on the plurality of topic words respectively corresponding to the two topics to obtain a processed second topic word group; and step 3, a proportion of the first topic word group in the second topic word group is determined, and the determined proportion is taken as the word overlapping degree between the two topics.

In the embodiment, for the two topics with the word overlapping degree to be calculated, word segmentation processing may be performed on the two topics to obtain a plurality of topic words corresponding to each topic. The word segmentation in one embodiment of the disclosure may be word-by-word segmentation, that is, the number of segmentations is equal to the number of words included in one topic. In another embodiment of the disclosure may further determine the words that can be segmented based on a dictionary. For example, for the two topics of "Travel in place B of country A" and "Travel in place B", the topic of "Travel in place B of country A" may be divided into three topic words: "country A", "place B" and "travel", and "travel in place B" may be divided into two topic words: "place B" and "travel".

After determining the plurality of topic words corresponding to each topic in the two topics, intersection processing and union processing of the topic words may be performed. The proportion of the first topic word group obtained by intersection processing in the second topic word group obtained by union processing may be determined as the word overlapping degree between the two topics.

The two topics "Travel in place B of country A" and "Travel in place B" are still used as examples, in a case that the three topic words corresponding to the topic "Travel in place B of country A" are "country A", "place B" and "travel", and the two topic words corresponding to the topic "Travel in place B" are "place B" and "travel", the first topic word group obtained from an intersection result is "Travel in place B" (corresponding to five words), "Travel in place B of country A" (corresponding to eight words) is obtained from an intersection result. At this time, ⅝ may be taken as the word overlapping degree of the above two topics.

The embodiment of the disclosure may realize the selection of the negative class topics by setting a predetermined threshold (such as 0.5) of the word overlapping degree. It can be seen that the above negative class topic selection method removes a pseudo negative class for training samples, which can help reduce an ambiguous negative class topic, allowing for more focused learning of the model and higher prediction accuracy of the model.

Those skilled in the art can understand that in the above method of the specific implementation, a writing order of all the steps does not mean a strict execution order which constitutes any restriction on an implementation process, and the specific execution order of all the steps should be determined by its function and possible internal logic.

Based on the same inventive concept, an embodiment of the disclosure further provides a multimedia content publishing apparatus corresponding to the multimedia content publishing method. Because the principle of the apparatus in the embodiment of the disclosure for solving the problem is similar to that of the above multimedia content publishing method in the embodiment of the disclosure, implementation of the apparatus may refer to implementation of the method, and the repetitions are omitted.

Embodiment 3

Figure 5:
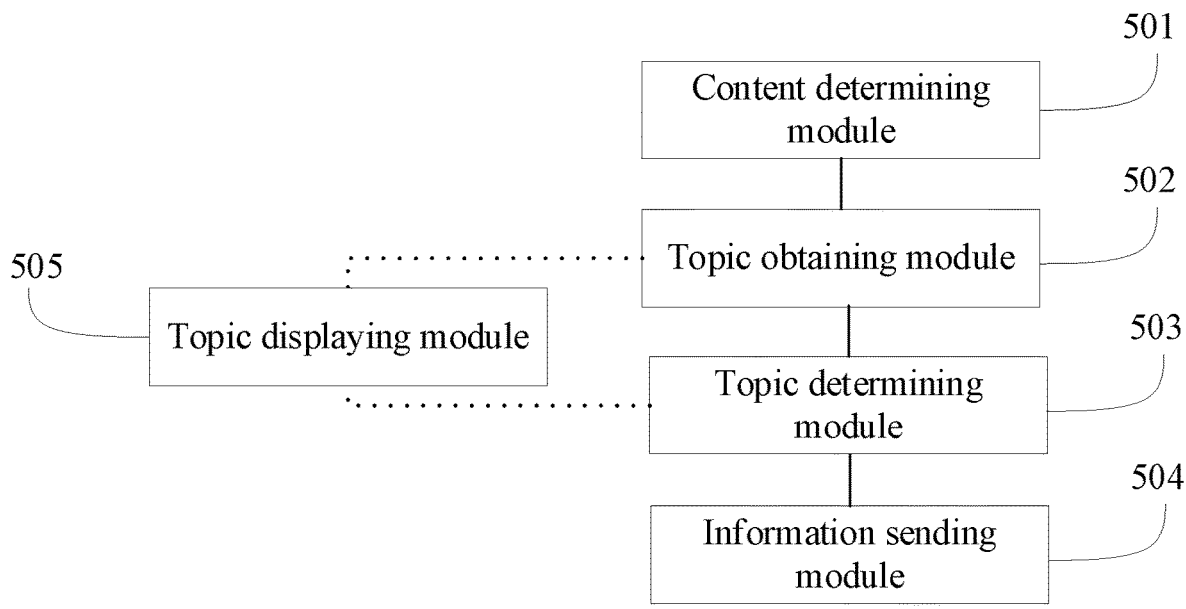
FIG. 5 shows a schematic diagram of a multimedia content publishing apparatus provided by embodiment 3 of the disclosure.

Referring to FIG. 5, a schematic diagram of an apparatus for multimedia content publishing provided by embodiments of the disclosure, the apparatus comprising:
  a content determining module 501, configured to determine a multimedia content to be published;
  a topic obtaining module 502, configured to obtain a plurality of candidate topics matching the multimedia content, the candidate topics being topics whose relevancy to the multimedia content meets a predetermined condition among topics included in a topic set;
  a topic determining module 503, configured to determine a selected target topic among the plurality of candidate topics; and
  an information sending module 504, configured to send multimedia content publishing information containing the target topic to a server in response to a multimedia content publishing request.

The above-described apparatus for multimedia content publishing is capable of automatically providing the user with a plurality of candidate topics, and saves the time of the user for thinking and editing the topic. In addition, the candidate topics provided by the above multimedia content publishing method for the user are topics with high relevancy to the multimedia content to be published. In this way, after the user selects the target topic from the candidate topics, the multimedia content containing the target topic may be sent to the server. Since the candidate topics are determined based on the relevancy with the multimedia content, thus to a certain extent it can provide more accurate topic alternatives for the multimedia content, and considering that the target topic is determined based on the result of the user's independent selection, thus the determined topic can be strongly related to the user's intention, which to a certain extent can more accurately express the multimedia content so that other user can more accurately understand the multimedia content and improve the service quality of the publishing platform.

In one embodiment, the topic selecting module 503 is configured to display, after obtaining the plurality of candidate topics matching the multimedia content and before determining the selected target topic among the plurality of candidate topics, the plurality of obtained candidate topics matching the multimedia content in a topic selection box corresponding to the topic input box after a target identifier input into a topic input box is detected.

In one embodiment, the topic selecting module 503 is used to determine the selected target topic among the plurality of candidate topics according to the following steps:
  displaying the target topic selected from the plurality of candidate topic in the topic input box corresponding to the topic selection box in response to a selection operation in the topic selection box.

In one embodiment, the apparatus further comprises:
  a topic displaying module 505, configured to display the plurality of obtained candidate topics matching the multimedia content in a vertical scrolling manner in response to a first trigger instruction for a vertical-row display mode, or
  display the plurality of obtained candidate topics matching the multimedia content in a horizontal scrolling manner in response to a second trigger instruction for a horizontal-row display mode.

Figure 6:
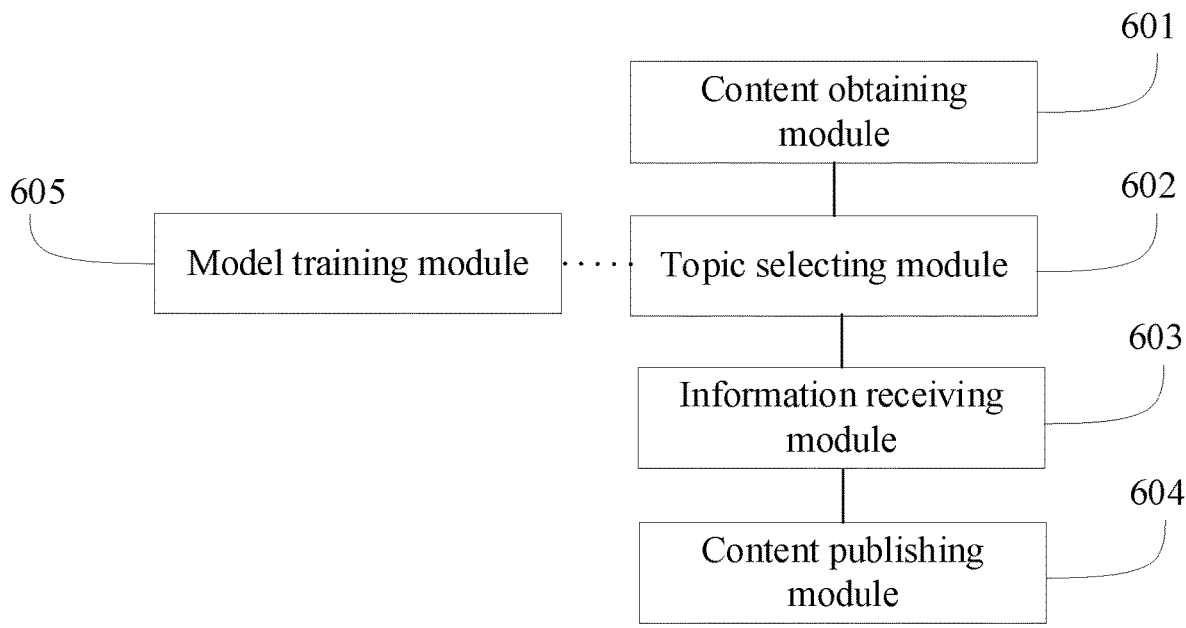
FIG. 6 shows a schematic diagram of a multimedia content publishing apparatus provided by embodiment 3 of the disclosure.

Referring to FIG. 6, a schematic diagram of an apparatus for multimedia content publishing provided by embodiments of the disclosure, the apparatus comprising:
  a content obtaining module 601, configured to obtain a multimedia content to be published;
  a topic selecting module 602, configured to select a plurality of candidate topics matching the multimedia content from a prestored topic set, and returning the plurality of selected candidate topics to a client;
  an information receiving module 603, configured to receive multimedia content publishing information containing a target topic, the target topic being included in the plurality of candidate topics; and
  a content publishing module 604, configured to publish the multimedia content based on the multimedia content publishing information.

In one embodiment, the topic selecting module 602 is used to select the plurality of candidate topics matching the multimedia content from a prestored topic set according to the following steps:
  determining relevancy between the multimedia content and each topic in the stored topic set by utilizing a trained relevancy model; and
  selecting the plurality of candidate topics from the topic set based on the relevancy.

In one embodiment, the apparatus further comprises:
  model training module 605, configured to:
  obtain a plurality of historical multimedia content and user-edited topics corresponding to each historical multimedia content;
  take, for each historical multimedia content, the user-edited topic corresponding to the historical multimedia content as a positive class topic corresponding to the historical multimedia content, and take the user-edited topics corresponding to historical multimedia content other than the historical multimedia content as a negative class topic corresponding to the historical multimedia content; and
  take each historical multimedia content, the positive class topic corresponding to the historical multimedia content, and the negative class topic corresponding to the historical multimedia content as a training data group, and train the relevancy model to be trained based on the plurality of training data groups so as to obtain model parameters of the relevancy model.

In one embodiment, the model training module 605 is used to train the relevancy model to be trained based on the plurality of training data groups so as to obtain model parameters of the relevancy model according to the following steps:
  inputting, for each training data group among the plurality of training data groups, the training data group into the relevancy model to be trained, so as to determine first relevancy between the historical multimedia content corresponding to the training data group and the positive class topic corresponding to the historical multimedia content, and second relevancy between the historical multimedia content corresponding to the training data group and each negative class topic corresponding to the historical multimedia content; and
  adjusting, if a difference value between the first relevancy and any second relevancy in all the second relevancy is less than a predetermined threshold, the model parameters of the relevancy model, and training the relevancy model to be trained again until the difference values between the first relevancy and each second relevancy are each greater than or equal to the predetermined threshold, and stopping training to obtain model parameters of the trained relevancy model.

In one embodiment, the model training module 605 is used to determine the negative class topic corresponding to each historical multimedia according to the following steps:

taking, for each historical multimedia content, the positive class topic corresponding to historical multimedia content other than the historical multimedia content, whose topic similarity with the positive class topic of the historical multimedia content is less than a predetermined threshold, as the negative class topic corresponding to the historical multimedia content.

In one embodiment, the topic similarity comprises a word overlapping degree, and the model training module 605 is used to determine the word overlapping degree comprises:

performing, for two topics for which the word overlapping degree is to be calculated, word segmentation processing on each of the two topics to obtain a plurality of topic words corresponding to each topic;

performing intersection processing on the plurality of topic words respectively corresponding to the two topics to obtain a processed first topic word group, and performing union processing on the plurality of topic words respectively corresponding to the two topics to obtain a processed second topic word group; and determining a proportion of the first topic word group in the second topic word group, and taking the determined proportion as the word overlapping degree between the two topics.

In one embodiment, the model training module 605 is used to train the relevancy model to be trained based on the plurality of training data groups so as to obtain model parameters of the relevancy model according to the following steps:

performing at least one round of training on the relevancy model to be trained based on the plurality of training data groups, wherein the step of one round of training comprises:

dividing the plurality of training data groups into a plurality of training data sets randomly before the current round of training of the relevancy model to be trained, and each training data set comprising multiple training data groups; and traversing each training data set among the plurality of training data sets sequentially, and performing the current round of model training on the relevancy model to be trained based on the traversed training data set until all the training data sets are traversed, so as to obtain the model parameters of the relevancy model trained in the current round.

In one embodiment, the model training module 605 is used to perform the current round of model training on the relevancy model to be trained based on the traversed training data set according to the following steps:

inputting, for each training data group in the traversed training data set, the training data group into the relevancy model to be trained, so as to determine the first relevancy between the historical multimedia content corresponding to the training data group and the positive class topic of the historical multimedia content, and the second relevancy between the historical multimedia content corresponding to the training data group and each negative class topic of the historical multimedia content; and selecting the predetermined sampling number of second target relevancy from all the second relevancy; and adjusting the model parameters of the current round of relevancy model to be trained based on the first relevancy and the predetermined sampling number of selected second target relevancy.

In one embodiment, the model training module 605 is used to select the predetermined sampling number of second target relevancy from all the second relevancy according to the following steps:

selecting a first number of second relevancy corresponding to a first predetermined proportion randomly from all the second relevancy based on the first predetermined proportion of the second target relevancy to be randomly selected in the predetermined sampling number of second target relevancy;

ranking all the second relevancy in an order from large to small, and selecting a second number of second relevancy corresponding to a second predetermined proportion from all the ranked second relevancy based on the second predetermined proportion of the second target relevancy to be sequentially selected in the predetermined sampling number of second target relevancy, wherein a sum value of the second predetermined proportion and the first predetermined proportion is 1; and determining the predetermined sampling number of second target relevancy based on the first number of second relevancy and the second number of second relevancy selected.

The description of the processing flow of the modules in the apparatus, and the interaction flow between the modules can be referred to the relevant descriptions in the method embodiments described above, and will not be described in detail here.

Embodiment 4

Figure 7:
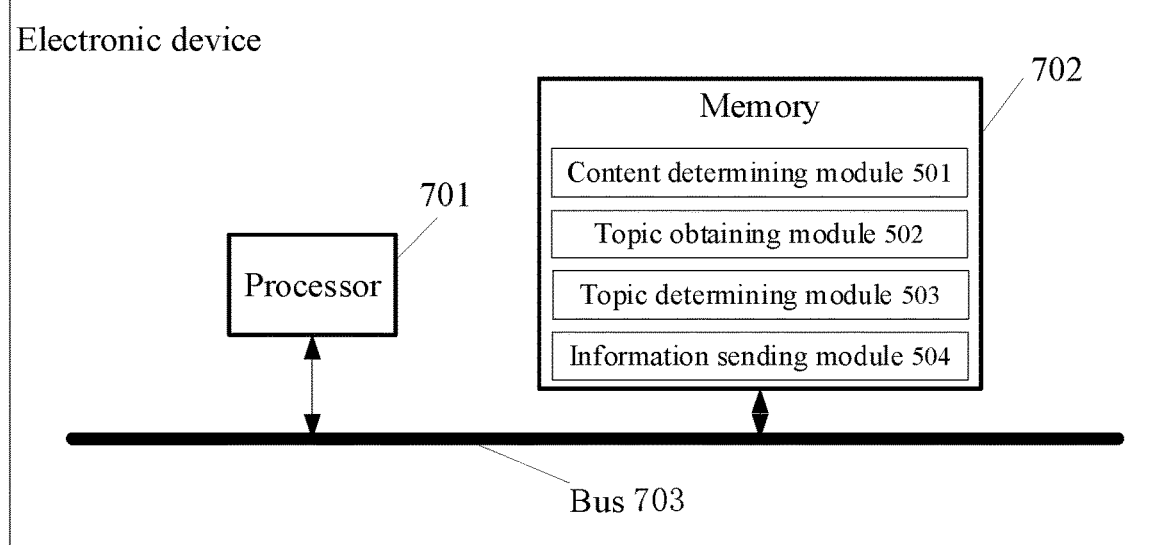
FIG. 7 shows a schematic diagram of an electronic device provided by embodiment 4 of the disclosure.

One embodiments of the disclosure also provide an electronic device, which may be a server or a client. When the electronic device is used as a client, a schematic diagram of the structure of the electronic device provided by embodiments of the disclosure is shown in FIG. 7. The electronic device includes: a processor 701, a memory 702, and a bus 703. The memory 702 stores machine-readable instructions executable by the processor 701 (such as those executed by content determining module 501, topic obtaining module 502, topic determining module 503, and information sending module 504 in the apparatus for multimedia content publishing shown in FIG. 5), and when the electronic device is running, the processor 701 communicates with the memory 702 through the bus 703, and the machine-readable instructions, when executed by the processor 701, cause the processor 701 to perform the following steps:

determining a multimedia content to be published;

obtaining a plurality of candidate topics matching the multimedia content, the candidate topics being topics whose relevancy to the multimedia content meets a predetermined condition among topics included in a topic set;

determining a selected target topic among the plurality of candidate topics; and sending multimedia content publishing information containing the target topic to a server in response to a multimedia content publishing request.

In one embodiment, after obtaining the plurality of candidate topics matching the multimedia content and before determining the selected target topic among the plurality of candidate topics, the steps performed by the processor 701 also include:

displaying, after a target identifier input into a topic input box is detected, the plurality of obtained candidate topics matching the multimedia content in a topic selection box corresponding to the topic input box.

In one embodiment, the determining a selected target topic among the plurality of candidate topics comprises:

displaying the target topic selected from the plurality of candidate topic in the topic input box corresponding to the topic selection box in response to a selection operation in the topic selection box.

In one embodiment, the steps performed by the processor 701 also include:

displaying the plurality of obtained candidate topics matching the multimedia content in a vertical scrolling manner in response to a first trigger instruction for a vertical-row display mode; or displaying the plurality of obtained candidate topics matching the multimedia content in a horizontal scrolling manner in response to a second trigger instruction for a horizontal-row display mode.

Figure 8:
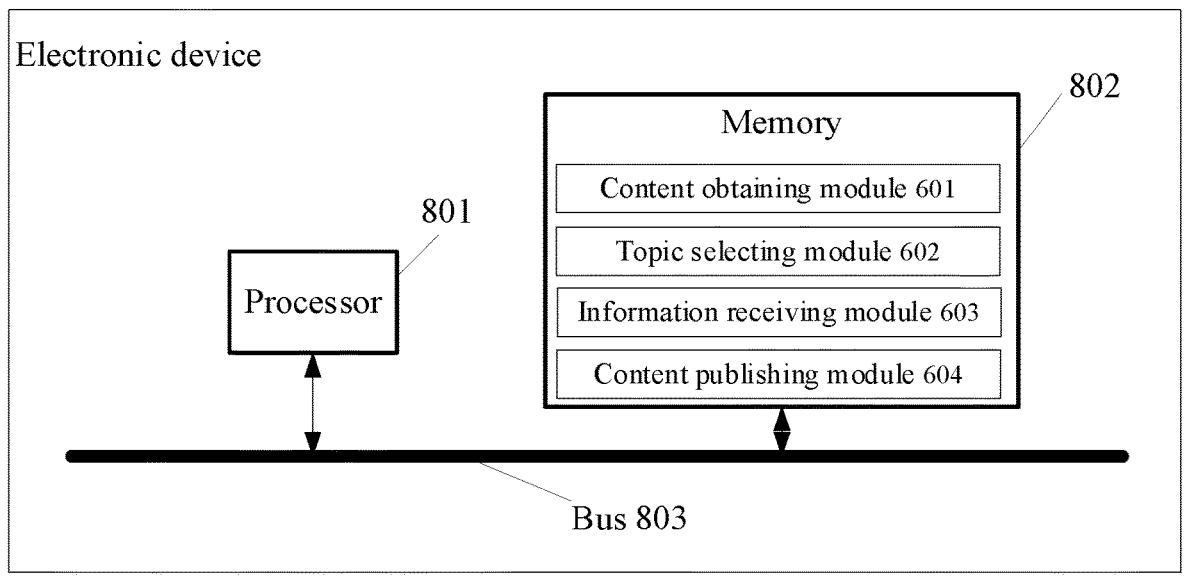
FIG. 8 shows a schematic diagram of another electronic device provided by embodiment 4 of the disclosure.

When the electronic device is used as a client, a schematic diagram of the structure of the electronic device provided by one embodiment of the disclosure is shown in FIG. 8. The electronic device includes: a processor 801, a memory 802, and a bus 803. The memory 802 stores machine-readable instructions executable by the processor 801 (such as those executed by content obtaining module 601, topic selecting module 602, information receiving module 603, and content publishing module 604 in the apparatus for multimedia content publishing shown in FIG. 6), and when the electronic device is running, the processor 801 communicates with the memory 802 through the bus 803, and the machine-readable instructions, when executed by the processor 801, cause the processor 801 to perform the following steps:

obtaining a multimedia content to be published;

selecting a plurality of candidate topics matching the multimedia content from a prestored topic set, and returning the plurality of selected candidate topics to a client;

receiving multimedia content publishing information containing a target topic, the target topic being a topic included in the plurality of candidate topics; and publishing the multimedia content based on the multimedia content publishing information.

In one embodiment, the selecting a plurality of candidate topics matching the multimedia content from a prestored topic set comprises:

determining relevancy between the multimedia content and each topic in the stored topic set by utilizing a trained relevancy model; and selecting the plurality of candidate topics from the topic set based on the relevancy.

In one embodiment, the step of training the relevancy model comprises:

obtaining a plurality of historical multimedia content and user-edited topics corresponding to each historical multimedia content;

taking, for each historical multimedia content, the user-edited topic corresponding to the historical multimedia content as a positive class topic corresponding to the historical multimedia content, and taking the user-edited topics corresponding to historical multimedia content other than the historical multimedia content as a negative class topic corresponding to the historical multimedia content; and taking each historical multimedia content, the positive class topic corresponding to the historical multimedia content, and the negative class topic corresponding to the historical multimedia content as a training data group, and training the relevancy model to be trained based on the plurality of training data groups so as to obtain model parameters of the relevancy model.

In one embodiment, the training the relevancy model to be trained based on the plurality of training data groups so as to obtain model parameters of the relevancy model comprises:

inputting, for each training data group among the plurality of training data groups, the training data group into the relevancy model to be trained, so as to determine first relevancy between the historical multimedia content corresponding to the training data group and the positive class topic corresponding to the historical multimedia content, and second relevancy between the historical multimedia content corresponding to the training data group and each negative class topic corresponding to the historical multimedia content; and adjusting, if a difference value between the first relevancy and any second relevancy in all the second relevancy is less than a predetermined threshold, the model parameters of the relevancy model, and training the relevancy model to be trained again until the difference values between the first relevancy and each second relevancy are each greater than or equal to the predetermined threshold, and stopping training to obtain model parameters of the trained relevancy model.

In one embodiment, the step of determining the negative class topic corresponding to each historical multimedia content comprises:

taking, for each historical multimedia content, the positive class topic corresponding to historical multimedia content other than the historical multimedia content, whose topic similarity with the positive class topic of the historical multimedia content is less than a predetermined threshold, as the negative class topic corresponding to the historical multimedia content.

In one embodiment, the topic similarity comprises a word overlapping degree, and the steps of determining the word overlapping degree comprises:

performing, for two topics for which the word overlapping degree is to be calculated, word segmentation processing on each of the two topics to obtain a plurality of topic words corresponding to each topic;

performing intersection processing on the plurality of topic words respectively corresponding to the two topics to obtain a processed first topic word group, and performing union processing on the plurality of topic words respectively corresponding to the two topics to obtain a processed second topic word group; and determining a proportion of the first topic word group in the second topic word group, and taking the determined proportion as the word overlapping degree between the two topics.

In one embodiment, the training the relevancy model to be trained based on the plurality of training data groups so as to obtain model parameters of the relevancy model comprises:

performing at least one round of training on the relevancy model to be trained based on the plurality of training data groups, wherein the step of one round of training comprises:

dividing the plurality of training data groups into a plurality of training data sets randomly before the current round of training of the relevancy model to be trained, and each training data set comprising multiple training data groups; and traversing each training data set among the plurality of training data sets sequentially, and performing the current round of model training on the relevancy model to be trained based on the traversed training data set until all the training data sets are traversed, so as to obtain the model parameters of the relevancy model trained in the current round.

In one embodiment, the performing the current round of model training on the relevancy model to be trained based on the traversed training data set comprises:

inputting, for each training data group in the traversed training data set, the training data group into the relevancy model to be trained, so as to determine the first relevancy between the historical multimedia content corresponding to the training data group and the positive class topic of the historical multimedia content, and the second relevancy between the historical multimedia content corresponding to the training data group and each negative class topic of the historical multimedia content; and selecting the predetermined sampling number of second target relevancy from all the second relevancy; and adjusting the model parameters of the current round of relevancy model to be trained based on the first relevancy and the predetermined sampling number of selected second target relevancy.

In one embodiment, the selecting the predetermined sampling number of second target relevancy from all the second relevancy comprises:

selecting a first number of second relevancy corresponding to a first predetermined proportion randomly from all the second relevancy based on the first predetermined proportion of the second target relevancy to be randomly selected in the predetermined sampling number of second target relevancy;

ranking all the second relevancy in an order from large to small, and selecting a second number of second relevancy corresponding to a second predetermined proportion from all the ranked second relevancy based on the second predetermined proportion of the second target relevancy to be sequentially selected in the predetermined sampling number of second target relevancy, wherein a sum value of the second predetermined proportion and the first predetermined proportion is 1; and determining the predetermined sampling number of second target relevancy based on the first number of second relevancy and the second number of second relevancy selected.

The specific execution process of the above instructions can be referred to the steps of the method of publishing multimedia content described in Examples 1 and 2 of the disclosure, and will not be repeated herein.

One embodiment of the disclosure further provides a computer readable storage medium, storing computer program that upon execution by an electronic device, cause the electronic device to perform the steps of the multimedia content publishing method described in Examples 1 and 2 of the disclosure. The storage medium may be a volatile or non-volatile computer readable storage medium.

The computer program product for the multimedia content publishing method provided by embodiments of the disclosure includes a computer readable storage medium on which program code is stored, said program code comprising instructions that can be used to perform the steps of the multimedia content publishing method described in method Embodiment 1 and Embodiment 2 above, as can be seen in the method embodiments above, which will not be repeated herein.

One embodiment of the disclosure further provides a computer program that implements any of the methods of the preceding embodiments when executed by a processor. The computer program product may be specifically implemented by means of hardware, software, or a combination thereof. In one optional embodiment, said computer program product is embodied specifically as a computer storage medium, and in another optional embodiment, the computer program product is embodied specifically as a software product, such as a Software Development Kit (SDK), and the like.

Those skilled in the art can clearly understand that, for the convenience and simplicity of description, the specific working process of the above described system and apparatus may refer to the corresponding process in the aforementioned method embodiments, and will not be repeated here. In several embodiments provided in the disclosure, it should be understood that the disclosed system, apparatus and method may be implemented in other ways. The above described apparatus embodiments are only schematic. For example, dividing of the units is only a kind of logical function dividing, and there may be other dividing modes in actual implementation. For another example, the plurality of units or components can be combined or integrated into another system, or some features can be ignored or not executed. On the other hand, the mutual coupling or direct coupling or communication connection shown or discussed may be indirect coupling or communication connection through some communication interfaces, apparatuses or units, and may be electrical, mechanical or in other forms.

The units described as separate parts may or may not be physically separated, and the parts displayed as units may or may not be physical units, that is, they may be located in one place or distributed onto a plurality of network units. Part or all of the units can be selected according to actual needs to implement the objectives of the solutions of the present embodiment.

In addition, each functional unit in each embodiment of the disclosure may be integrated into one processing unit, or each unit may exist physically alone, or two or more units may be integrated into one unit.

The function, if implemented in the form of a software functional unit and sold or used as an independent product, may be stored in a nonvolatile computer readable storage medium that can be executed by a processor. Based on this understanding, the technical solutions of the disclosure essentially, or parts contributing to the prior art, or part of the technical solutions can be embodied in a software product form. A computer software product is stored in a storage medium, including a plurality of instructions used to cause an electronic device (may be a personal computer, a server, a network device, etc.) to execute all or part of the steps of the methods in all the embodiments of the disclosure. The aforementioned storage medium includes: a U disk, a mobile hard disk, a read-only memory (ROM), a random access memory (RAM), a magnetic disk or an optical disk and other media that can store program codes.

Finally, it should be noted that the above embodiments are only specific implementations of the disclosure and are used to illustrate the technical solutions of the disclosure but not limit it. The protection scope of the disclosure is not limited to this. Although the disclosure has been illustrated in detail with reference to the aforementioned embodiments, those skilled in the art should understand that: any person skilled in the art can still modify or easily think of changes to the technical solutions recorded in the aforementioned embodiments, or make equivalent replacement for part of the technical features thereinto within the technical scope disclosed in the disclosure. However, these modifications, changes or replacements do not make the nature of the corresponding technical solutions separate from the spirit and scope of the technical solutions of the embodiments of the disclosure, and should be covered the protection scope of the disclosure. Therefore, the protection scope of the disclosure should be subjected to the protection scope of the claims.

What is claimed is:

1. A multimedia content publishing method, comprising:
   determining a multimedia content to be published;
   obtaining a plurality of candidate topics matching the multimedia content, the candidate topics being topics whose relevancy to the multimedia content meets a predetermined condition among topics included in a topic set;
   displaying the plurality of candidate topics matching the multimedia content;
   determining a selected target topic among the plurality of candidate topics; and
   sending multimedia content publishing information containing the selected target topic to a server in response to a multimedia content publishing request,
   wherein the relevancy is determined by a relevancy model, and wherein the relevancy model is obtained by:
   obtaining a plurality of historical multimedia content items and at least one user-edited topic corresponding to each historical multimedia content item among the plurality of historical multimedia content items,
   determining, for each historical multimedia content item, the at least one user-edited topic corresponding to the each historical multimedia content item as a positive class topic corresponding to the each historical multimedia content item, and determining user-edited topics corresponding to other historical multimedia content items as negative class topics corresponding to the each historical multimedia content item,
   generating a plurality of training data groups, wherein each of the plurality of training data groups comprises one of the plurality of historical multimedia content items, the positive class topic corresponding to the historical multimedia content item, and the negative class topics corresponding to the historical multimedia content item, and
   training the relevancy model based on the plurality of training data groups to obtain model parameters of the relevancy model.

2. The method according to claim 1, wherein after obtaining the plurality of candidate topics matching the multimedia content and before determining the selected target topic among the plurality of candidate topics, the method further comprises:
   displaying, after a target identifier input into a topic input box is detected, the plurality of candidate topics matching the multimedia content in a topic selection box corresponding to the topic input box.

3. The method according to claim 2, wherein the determining a selected target topic among the plurality of candidate topics comprises:
   displaying the selected target topic selected from the plurality of candidate topics in the topic input box corresponding to the topic selection box in response to a selection operation in the topic selection box.

4. The method according to claim 2, further comprising:
   displaying the plurality of candidate topics matching the multimedia content in a horizontal scrolling manner in response to a first trigger instruction for a horizontal-row display mode; or
   displaying the plurality of candidate topics matching the multimedia content in a vertical scrolling manner in response to a second trigger instruction for a vertical-row display mode.

5. A multimedia content publishing method, comprising:
   obtaining a multimedia content to be published;
   selecting a plurality of candidate topics matching the multimedia content from a prestored topic set by utilizing a relevancy model, and returning the plurality of selected candidate topics to a client;
   receiving multimedia content publishing information containing a target topic, the target topic being a topic included in the plurality of candidate topics; and
   publishing the multimedia content based on the multimedia content publishing information, wherein the relevancy model is obtained by:
   obtaining a plurality of historical multimedia content items and at least one user-edited topic corresponding to each historical multimedia content item among the plurality of historical multimedia content items,
   determining, for each historical multimedia content item, the at least one user-edited topic corresponding to the each historical multimedia content item as a positive class topic corresponding to the each historical multimedia content item, and determining user-edited topics corresponding to other historical multimedia content items as negative class topics corresponding to the each historical multimedia content item,
   generating a plurality of training data groups, wherein each of the plurality of training data groups comprises one of the plurality of historical multimedia content items, the positive class topic corresponding to the historical multimedia content item, and the negative class topics corresponding to the historical multimedia content item, and
   training the relevancy model based on the plurality of training data groups to obtain model parameters of the relevancy model.

6. The method according to claim 5, wherein the selecting a plurality of candidate topics matching the multimedia content from a prestored topic set by utilizing a relevancy model comprises:
   determining relevancy between the multimedia content and each topic in the prestored topic set by utilizing the relevancy model; and
   selecting the plurality of candidate topics from the prestored topic set based on the relevancy.

7. The method according to claim 5, wherein the training the relevancy model based on the plurality of training data groups to obtain model parameters of the relevancy model comprises:

inputting, for each training data group among the plurality of training data groups, the training data group into the relevancy model to be trained, so as to determine first relevancy between the historical multimedia content item corresponding to the training data group and the positive class topic corresponding to the historical multimedia content item, and second relevancy between the historical multimedia content item corresponding to the training data group and each negative class topic corresponding to the historical multimedia content item; and adjusting, based on a difference value between the first relevancy and any second relevancy in all the second relevancy being less than a predetermined threshold, the model parameters of the relevancy model, and training the relevancy model to be trained again until the difference values between the first relevancy and each second relevancy are each greater than or equal to the predetermined threshold, and stopping training to obtain model parameters of the trained relevancy model.

8. The method according to claim 5, wherein the determining user-edited topics corresponding to the other historical multimedia content items as negative class topics corresponding to the historical multimedia content item comprises:
determining the positive class topics corresponding to the other historical multimedia content items among the plurality of historical multimedia content items having a topic similarity with the positive class topic of the historical multimedia content item that is less than a predetermined threshold, as the negative class topics corresponding to the historical multimedia content item.

9. The method according to claim 8, wherein the topic similarity comprises a word overlapping degree, and wherein the method further comprises determining the word overlapping degree based on:
performing, for two topics for which the word overlapping degree is to be calculated, word segmentation processing on each of the two topics to obtain a plurality of topic words corresponding to each topic;
performing intersection processing on the plurality of topic words respectively corresponding to the two topics to obtain a processed first topic word group, and performing union processing on the plurality of topic words respectively corresponding to the two topics to obtain a processed second topic word group; and
determining a proportion of the first topic word group in the second topic word group, and taking the determined proportion as the word overlapping degree between the two topics.

10. The method according to claim 5, wherein the training the relevancy model to be trained based on the plurality of training data groups to obtain model parameters of the relevancy model comprises:
performing at least one round of training on the relevancy model to be trained based on the plurality of training data groups, wherein the performing the at least one round of training comprises:
dividing the plurality of training data groups into a plurality of training data sets randomly before a current round of model training of the relevancy model to be trained, and each training data set comprising multiple training data groups; and
traversing each training data set among the plurality of training data sets sequentially, and performing the current round of model training on the relevancy model to be trained based on the traversed training data set until all the training data sets are traversed, so as to obtain the model parameters of the relevancy model trained in the current round.

11. The method according to claim 10, wherein the performing the current round of model training on the relevancy model to be trained based on the traversed training data set comprises:
inputting, for each training data group in the traversed training data set, the training data group into the relevancy model to be trained, so as to determine a first relevancy between the historical multimedia content item corresponding to the training data group and the positive class topic of the historical multimedia content item, and a second relevancy between the historical multimedia content item corresponding to the training data group and each negative class topic of the historical multimedia content item; and
selecting a predetermined sampling number of second target relevancies from all the second relevancies; and
adjusting the model parameters of the current round of model training based on the first relevancy and the selected predetermined sampling number of the second target relevancies.

12. The method according to claim 11, wherein the selecting the predetermined sampling number of the second target relevancies from all the second relevancies comprises:
selecting a first number of second relevancies randomly from all the second relevancies based on a first predetermined proportion of the predetermined sampling number of the second target relevancies;
ranking all the second relevancies in an order from largest to smallest, and sequentially selecting a second number of second relevancies from all the ranked second relevancies based on a second predetermined proportion of the predetermined sampling number of the second target relevancies, wherein a sum value of the second predetermined proportion and the first predetermined proportion is 1; and
determining the predetermined sampling number of the second target relevancies based on the selected first number of second relevancies and the selected second number of second relevancies.

13. A multimedia content publishing apparatus, comprising:
at least one processor; and
at least one memory communicatively coupled to the at least one processor and storing instructions that upon execution by the at least one processor cause the apparatus to:
determine a multimedia content to be published;
obtain a plurality of candidate topics matching the multimedia content, the candidate topics being topics whose relevancy to the multimedia content meets a predetermined condition among topics included in a topic set;
display the plurality of candidate topics matching the multimedia content;
determine a selected target topic among the plurality of candidate topics; and
send multimedia content publishing information containing the selected target topic to a server in response to a multimedia content publishing request,
wherein the relevancy is determined by a relevancy model, and wherein the relevancy model is obtained by:

obtaining a plurality of historical multimedia content items and at least one user-edited topic corresponding to each historical multimedia content item among the plurality of historical multimedia content items, determining, for each historical multimedia content item, the at least one user-edited topic corresponding to the each historical multimedia content item as a positive class topic corresponding to the each historical multimedia content item, and determining user-edited topics corresponding to other historical multimedia content items as negative class topics corresponding to the each historical multimedia content item, generating a plurality of training data groups, wherein each of the plurality of training data groups comprises one of the plurality of historical multimedia content items, the positive class topic corresponding to the historical multimedia content item, and the negative class topics corresponding to the historical multimedia content item, and training the relevancy model based on the plurality of training data groups to obtain model parameters of the relevancy model.

14. The multimedia content publishing apparatus according to claim 13, wherein the instructions that upon execution by the at least one processor cause the apparatus to:

display, after a target identifier input into a topic input box is detected, the plurality of candidate topics matching the multimedia content in a topic selection box corresponding to the topic input box.

15. The multimedia content publishing apparatus according to claim 14, wherein the instructions that upon execution by the at least one processor cause the apparatus to:

display the selected target topic selected from the plurality of candidate topics in the topic input box corresponding to the topic selection box in response to a selection operation in the topic selection box.

16. The multimedia content publishing apparatus according to claim 14, wherein the instructions that upon execution by the at least one processor cause the apparatus to:

display the plurality of candidate topics matching the multimedia content in a horizontal scrolling manner in response to a first trigger instruction for a horizontal-row display mode; or display the plurality of candidate topics matching the multimedia content in a vertical scrolling manner in response to a second trigger instruction for a vertical-row display mode.

17. A multimedia content publishing apparatus, comprising:

at least one processor; and at least one memory communicatively coupled to the at least one processor and storing instructions that upon execution by the at least one processor cause the apparatus to:

obtain a multimedia content to be published;

select a plurality of candidate topics matching the multimedia content from a prestored topic set utilizing a relevancy model, and returning the plurality of selected candidate topics to a client;

receive multimedia content publishing information containing a target topic, the target topic being included in the plurality of candidate topics; and publish the multimedia content based on the multimedia content publishing information, wherein the relevancy model is obtained by:

obtaining a plurality of historical multimedia content items and at least one user-edited topic corresponding to each historical multimedia content item among the plurality of historical multimedia content items, determining, for each historical multimedia content item, the at least one user-edited topic corresponding to the each historical multimedia content item as a positive class topic corresponding to the each historical multimedia content item, and determining user-edited topics corresponding to other historical multimedia content items as negative class topics corresponding to the each historical multimedia content item, generating a plurality of training data groups, wherein each of the plurality of training data groups comprises one of the plurality of historical multimedia content items, the positive class topic corresponding to the historical multimedia content item, and the negative class topics corresponding to the historical multimedia content item, and training the relevancy model based on the plurality of training data groups to obtain model parameters of the relevancy model.

18. The multimedia content publishing apparatus according to claim 17, wherein the training the relevancy model based on the plurality of training data groups to obtain model parameters of the relevancy model comprises:

inputting, for each training data group among the plurality of training data groups, the training data group into the relevancy model to be trained, so as to determine first relevancy between the historical multimedia content item corresponding to the training data group and the positive class topic corresponding to the historical multimedia content item, and second relevancy between the historical multimedia content item corresponding to the training data group and each negative class topic corresponding to the historical multimedia content item; and adjusting, based on a difference value between the first relevancy and any second relevancy in all the second relevancy being less than a predetermined threshold, the model parameters of the relevancy model, and training the relevancy model to be trained again until the difference values between the first relevancy and each second relevancy are each greater than or equal to the predetermined threshold, and stopping training to obtain model parameters of the trained relevancy model.

19. The multimedia content publishing apparatus according to claim 17, wherein the determining user-edited topics corresponding to other historical multimedia content items as negative class topics corresponding to the historical multimedia content item comprises:

determining the positive class topics corresponding to the other historical multimedia content items among the plurality of historical multimedia content items having a topic similarity with the positive class topic of the historical multimedia content item that is less than a predetermined threshold, as the negative class topics corresponding to the historical multimedia content item.

20. The multimedia content publishing apparatus according to claim 17, wherein the training the relevancy model to be trained based on the plurality of training data groups to obtain model parameters of the relevancy model comprises:

performing at least one round of training on the relevancy model to be trained based on the plurality of training data groups, wherein the performing the at least one round of training comprises:

dividing the plurality of training data groups into a plurality of training data sets randomly before a current round of model training of the relevancy model to be trained, and each training data set comprising multiple training data groups; and traversing each training data set among the plurality of training data sets sequentially, and performing the current round of model training on the relevancy model to be trained based on the traversed training data set until all the training data sets are traversed, so as to obtain the model parameters of the relevancy model trained in the current round.

* * * * *